United States Patent
Curlier et al.

(10) Patent No.: US 10,253,910 B2
(45) Date of Patent: Apr. 9, 2019

(54) HYDRAULIC CONNECTION DEVICE AND FLUID TRANSFER SYSTEM USING SAID DEVICE

(71) Applicant: SNECMA, Paris (FR)

(72) Inventors: Augustin Curlier, Moissy-Cramayel (FR); Philippe Vertenoeuil, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 301 days.

(21) Appl. No.: 15/023,596

(22) PCT Filed: Sep. 24, 2014

(86) PCT No.: PCT/FR2014/052390
§ 371 (c)(1),
(2) Date: Mar. 21, 2016

(87) PCT Pub. No.: WO2015/044586
PCT Pub. Date: Apr. 2, 2015

(65) Prior Publication Data
US 2016/0208970 A1 Jul. 21, 2016

(30) Foreign Application Priority Data
Sep. 24, 2013 (FR) .................................. 13 59182

(51) Int. Cl.
*F16L 27/06* (2006.01)
(52) U.S. Cl.
CPC .................................. *F16L 27/06* (2013.01)

(58) Field of Classification Search
CPC ....... F16L 27/047; F16L 27/06; F16L 27/026; F16L 27/12; F16L 27/125
(Continued)

(56) References Cited

U.S. PATENT DOCUMENTS 2,421,691 A * 6/1947 Gibson, Jr. ............ F16L 27/026
285/101
2,931,672 A * 4/1960 Merritt ................. F16L 27/047
248/56
(Continued)

FOREIGN PATENT DOCUMENTS

EP     0 870 965 A1    10/1998

OTHER PUBLICATIONS

Written Opinion of the International Searching Authority dated Dec. 18, 2014, issued in corresponding International Application No. PCT/FR2014/052390, filed Sep. 24, 2014, 6 pages.
(Continued)

*Primary Examiner* — Aaron M Dunwoody
(74) *Attorney, Agent, or Firm* — Christensen O'Connor Johnson Kindness PLLC

(57) ABSTRACT

The invention relates to a hydraulic connection device comprising a part with an opening for the throughflow of hydraulic fluid and a tubular rod with an end fitting, the end fitting of the rod being hydraulically connected to the opening for the throughflow of the fluid, wherein the opening and the end fitting of the rod each have a portion of surface which is shaped so as to allow a certain angular movement between the part and the rod, a seal being inserted between said two surface portions.

9 Claims, 3 Drawing Sheets

(58) Field of Classification Search
USPC .................................. 285/261, 263, 267, 298
See application file for complete search history.

(56) References Cited

U.S. PATENT DOCUMENTS

| | | | | | |
|---|---|---|---|---|---|
| 3,454,288 | A | * | 7/1969 | Mancusi, Jr. | ............ F16L 27/04 277/507 |
| 3,477,748 | A | * | 11/1969 | Tinsley | ................. E21B 43/127 285/267 |
| 3,663,043 | A | * | 5/1972 | Walton | .................. F16L 27/053 285/113 |
| 3,874,706 | A | * | 4/1975 | Arnold | .................... F16L 19/08 285/105 |
| 4,318,548 | A | * | 3/1982 | Oberle | .................... F16L 49/04 277/608 |
| 4,482,171 | A | * | 11/1984 | Campbell | ................ F16L 17/00 285/370 |
| 4,556,227 | A | * | 12/1985 | Sato | ....................... F16L 27/026 277/507 |
| 4,840,409 | A | * | 6/1989 | Welkey | ................. F16L 27/053 277/625 |
| 6,237,965 | B1 | * | 5/2001 | Kuo | ....................... F16L 27/026 285/111 |
| 8,157,295 | B2 | * | 4/2012 | Krywitsky | .............. F16L 27/06 285/263 |
| 2002/0158464 | A1 | * | 10/2002 | Cummins | ................ F16L 27/12 285/93 |
| 2004/0245777 | A1 | * | 12/2004 | Vila | ....................... F16L 27/047 285/261 |
| 2005/0001423 | A1 | * | 1/2005 | Vila | ....................... F16J 15/3212 285/223 |
| 2008/0122221 | A1 | * | 5/2008 | Bridgewater | ........... F16L 27/04 285/184 |
| 2008/0230627 | A1 | * | 9/2008 | Stewart | .................... B05B 15/08 239/203 |
| 2011/0198844 | A1 | * | 8/2011 | Weinhold | ................. F16L 27/12 285/366 |
| 2015/0285418 | A1 | * | 10/2015 | Rempert | ................. F16L 41/18 285/363 |
| 2015/0338003 | A1 | * | 11/2015 | Saito | ....................... F16L 27/12 285/261 |
| 2016/0298798 | A1 | * | 10/2016 | Rickards | ................ F16L 27/053 |

OTHER PUBLICATIONS

International Preliminary Report on Patentability dated Mar. 29, 2016, issued in corresponding International Application No. PCT/FR2014/052390, filed Sep. 24, 2014, 1 page.

International Search Report dated Dec. 18, 2014, issued in corresponding International Application No. PCT/FR2014/052390, filed Sep. 24, 2014, 2 pages.

* cited by examiner

HYDRAULIC CONNECTION DEVICE AND FLUID TRANSFER SYSTEM USING SAID DEVICE

TECHNICAL FIELD

Embodiments of the present disclosure relate to the field of hydraulic connections between a part having a fluid distribution opening and a tubular element through which the fluid travels. It also relates to the application of connections in a device for hydraulic fluid transfer between a fixed reference frame and a reference frame which is movable in translation in relation thereto, such as, inside a turbine engine, between a casing part of the engine and the movable portion of a hydraulic actuator actuating a member of the turbine engine.

BACKGROUND

The problem addressed by the disclosure falls within the scope of supplying a linear actuator with hydraulic fluid but is not limited to this application.

In the example in FIG. 1, a fixed case element 1 of an engine, such as a turbine engine, comprises a frustoconical collar 1V and an axial extension 1C on which a linear actuator or linear hydraulic actuator 3 is mounted. The actuator is formed from a static portion 31, forming a piston, which is rigidly connected to the casing axial extension and a portion 32, forming a cylinder, which is movable in translation along the axis of the casing. The static and movable portions delimit two chambers, A and B respectively, therebetween, which chambers are supplied, one by an opening 35A of the chamber A, which is located on the side of the collar, and an opening 35B of the opposing chamber B. The movable portion of the actuator is connected to a member (not shown) of the engine which is used to control the position. The collar 1 comprises an opening 7A for selectively distributing fluid which is connected by a duct for supplying hydraulic fluid to the opening 35A of the chamber A of the actuator and an opening 7B for selectively distributing fluid which is connected by a duct for supplying hydraulic fluid to the opening of the chamber B of the actuator.

In operation, the distance between the openings for distributing fluid in the collar and that of the chambers of the actuator varies according to the position of the movable portion 32, along the axis of the casing extension 1C. A means for adapting the length of the ducts for supplying fluid to the distance between the openings is to arrange telescopic tubular rods, 8A and 8B. The ends of the telescopic rods are connected for example to the respective openings by connection means of the type comprising a nipple and a nozzle, which are known per se. A connection means or hydraulic connection 10 of this type from the prior art is shown in FIG. 2; it comprises a nozzle 12 at the end of a tubular rod which is supported against an axially open nipple 14. The nipple is rigidly connected, by being joined by screwing for example, to a tubular recess which is made in the axis of the opening (not shown) and which is located in the collar or even in the movable portion of the actuator. The recess is not shown here. The two elements of the connection, the nozzle and the nipple 12 and 14, are kept assembled by a nut (not shown) which is caught between the span 12P, which is perpendicular to the axis, and present on the nozzle, and the screw pitch 14V machined on the nipple 14. This type of assembly does not allow any angular displacement between the part by which the fluid is distributed and the tubular rod which is connected thereto. It is rigid.

The following problem may arise from the configurations of the prior art. During the return of the movable portion 32 of the linear actuator towards the casing 1 where the supply of hydraulic fluid is located and in particular when the actuator is at a high pressure, the telescopic system of rods can become locked and buckle under the force of the actuator. The locking occurs if the alignment is incorrect.

The locking, followed by the failure of the system of telescopic rods, can occur during the misalignment between the casing 1 on which the oil inflow is located and the fixed portion 31 of the actuator 3, the portion being rigidly connected to the casing. The misalignment is expected when the turbine engine is subjected to high mechanical stresses.

In the case of a misalignment between the casing and the movable portion of the actuator, an angle is induced between the two telescopic rods which slide one inside the other. The force which is perpendicular to the surface of the rod and the resistance to the sliding increase. If this angle becomes too great and reaches a critical value, depending on the geometric characteristics of the rods and the coefficient of friction between the rods, the friction between the rods can lead to locking. Over-center locking thus occurs and, under the effect of the hydraulic actuator, the rods buckle. The consequence would thus be a failure of the whole system, leading to an extremely critical situation in the case of an aeronautical application.

The over-center locking phenomenon is produced in a mechanical system when the configuration of the system is such that the adhesion prevents any movement, regardless of the strength of the external mechanical influences.

SUMMARY

The applicant has set itself the objective of limiting, or even eliminating, the risks of locking of the tubular rods during the displacement in translation of the movable portion of the actuator.

Insofar as the locking is caused by the rigidity of the assembly of the rods with the parts, the applicant has set itself the more general objective of developing a hydraulic connection allowing angular displacement without the sealing of the circuit being affected thereby.

It is in this way that, in accordance with a first aspect of the disclosure, the hydraulic connection comprising a part having a hydraulic fluid passage opening and a tubular rod having an end piece, the end piece of the rod being hydraulically connected to the opening in the fluid passage, is wherein the opening and the end piece of the rod each comprise a surface portion which is shaped so as to allow an angular displacement between the part and the rod, a seal being interposed between the two surface portions.

By means of the solution from the disclosure, allowing a limited rotation reduces the stresses on the parts. In the case of the specific application intended by the present application, the misalignments between the casing and the movable portion are compensated by a limited rotation of the rod in relation to the casing, locking is prevented, as well as the failure of the system of rods for transferring hydraulic fluid between the casing and the actuator. The suitably selected seal ensures the impermeability of the fluid circuit in this region.

In an embodiment, one of the two surface portions comprises an annular groove, and the seal is received in the annular groove. The seal advantageously comprises a contact ring, which is preferably made of rigid material, which is supported against the other of the two surface portions, and a resilient element is interposed between the bottom of the groove and the ring made of rigid material. This type of seal makes it possible to ensure the impermeability of the circuit when the hydraulic fluid is at a high pressure. In the application in question, it is approximately 120 to 160 bars.

In some embodiments, the contact ring made of rigid material of the seal comprises a bearing surface on the other surface portion, which has a frustoconical shape. In an embodiment, the groove is made in the surface portion of the fluid passage opening.

In order to ensure that the end of the rod is kept in place in relation to the part whilst allowing an angular adjustment of the position thereof in relation to the part, that is to say in order to preserve the pivoting properties, the device comprises a nut or another equivalent means for keeping the tubular rod in the opening. The nut or other means keeps the end piece of the rod in the axis of the opening when no stress is applied to the rod. In order to prevent the rod from being locked in position by the clamping pressure exerted by the nut, a resilient means is arranged between the nut and the end piece of the tubular rod. More specifically, the resilient means is an O ring forming a seal and it is received in an annular groove produced in the end piece of the tubular rod or even in the surface portion of the nut opposite the end piece. The two seals are pressurized by being compressed during the fitting.

Embodiments of the disclosure can advantageously be applied in a system for transferring fluid between a fixed casing and a member which is movable in translation in relation to the fixed casing. The system comprises a tubular rod having a device for fluid connection to either the casing or the movable member.

In some embodiments, the tubular rod is an element of a telescopic device, and the fluid transfer system comprises a hydraulic connection firstly between the casing and a tubular rod of the device and secondly between another tubular rod of the device and the movable member.

Embodiments of the disclosure are advantageously applied when the member which is movable in translation belongs to a linear actuator.

According to another aspect of the disclosure, a turbine engine is provided comprising at least one fluid connection device and/or a fluid transfer system according to the disclosure.

Thus the function of transferring oil between a fixed reference frame supporting the supply and the portion which is movable in translation of the actuator is carried out by means of telescopic tubes which slide one inside the other according to the fluctuation in the axial position of the movable portion of the actuator. The advantage of such a system is that it ensures the transfer of hydraulic fluid regardless of the axial position of the actuator.

However, since it is coupled to a standard connector of the nipple/nozzle type on each side, the system would be extremely sensitive to any misalignment between the casing supporting the fluid supply and the casing of the actuator, and this is prevented using hydraulic connections from the disclosure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 3:
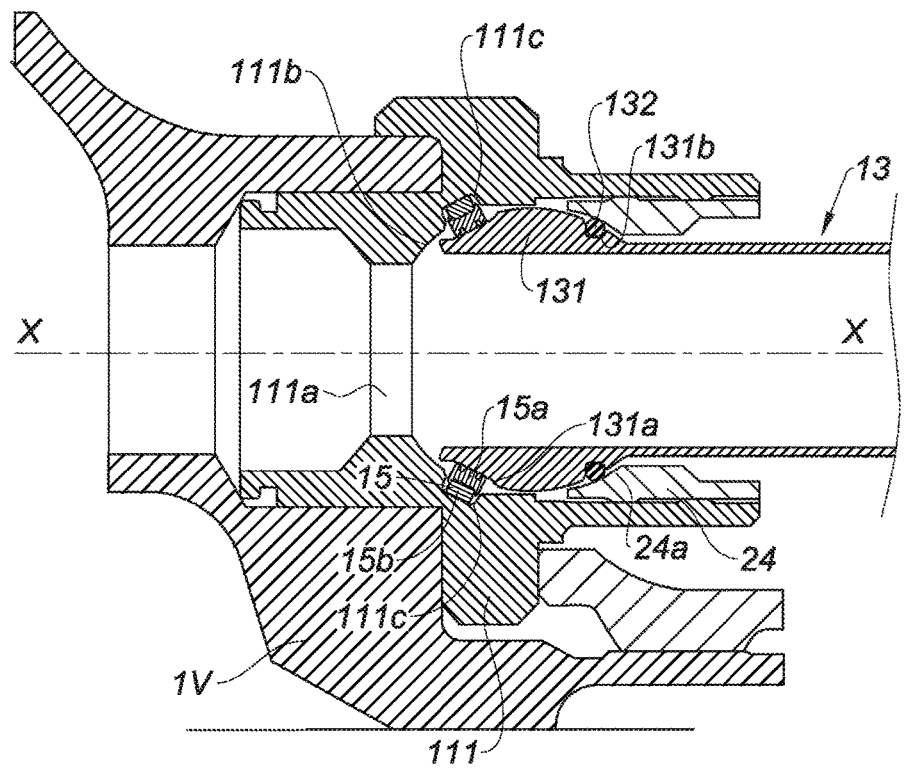
FIG. 3 is an axial section of a representative embodiment of a hydraulic connection according to the disclosure.
Figure 4:
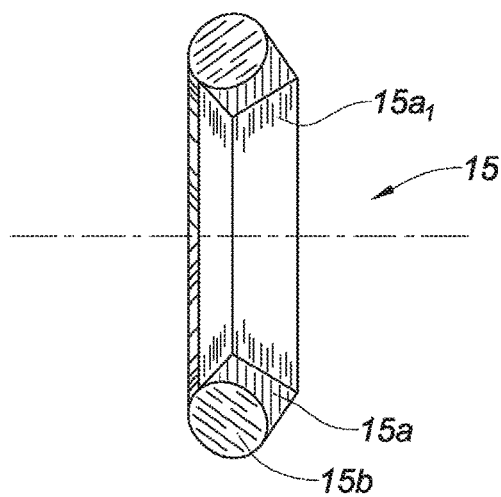
FIG. 4 is a sectional view in a plane passing through the axis of the O-ring seal of the connection.

In FIG. 3, a connection according to the disclosure is shown in axial section. According to the example illustrated in this drawing, the elements to be connected are a case element 1V and a tubular rod 13. The case element is pierced by an opening through which a hydraulic fluid is distributed from a pipe which cannot be seen in the drawing and is located upstream of the casing. A part forming the connection element 111 is mounted on the casing so as to be rigidly connected thereto and has a channel which ends in an opening 111*a*, is circular and has an axis XX, in the extension of the opening of the casing.

The rod 13, only the end of which is shown, has an end piece 131 at the end, which end piece is received in the part forming the connection element 111, to the right of the opening 111*a*.

A nut 24 holds the end piece in the recess thereof on the connection element by being screwed there, but it can also be rigidly connected by any other means. The nut 24 surrounds the rod 13 by providing around the rod, as is shown in the drawing, an annular space forming a clearance, the maximum value of which is determined by the angular displacement desired for the rod. The connection element in which the recess is produced is preferably provided with a thread which is produced on a cylindrical extension around the bottom.

The nut can be replaced for example by a ring which also has a spherical inner span and is screwed by means of a resilient ring or a circlip.

The bottom of the recess around the opening 111*a* of the connection element 111 comprises a wall having a curved shape 111*b*, such as a spherical shape, which is centered on the axis XX. An annular groove 111*c* which is centered on the axis XX is machined into the wall 111*b*.

The groove 111*c* receives an O-ring seal 15 which preferably has a composite structure by being formed by a contact ring 15*a* having a contact surface 15*a*1. The contact surface is for example conical, and the axis thereof coincides with the axis XX, when the seal is in place. The contact ring 15*a* has for example a polygonal cross section in an axial plane. Between the contact ring 15a and the bottom of the groove, the seal comprises a resilient ring 15b, made of elastomeric material. It exerts a restoring force between the contact ring 15a when it is compressed in the bottom of the groove. The contact ring consists of a material which is more rigid than the elastomeric material of the resilient ring 15b. The material is of the type to ensure sealing when the ring is supported against the counterpart thereof on the end piece 131.

The end piece 131, which can be formed in one piece with the tubular rod, has a spherical overall shape with, on the side of the free end of the rod, a bearing surface 131a, which is coordinated with the contact surface 15a1 of the sealing ring 15. The bearing surface is frustoconical in this case.

On the side of the rod, the end piece has an annular groove 131b having an axis which is coincident with that of the rod for receiving a resilient means 132 made of elastomeric material forming the O ring. The portion of the surface of the end piece interacts with a bearing surface 24a of the nut 24 which is preferably spherical, as is that of the end piece.

During fitting, the end piece 131 of the rod is inserted into the recess of the connection element 111 on the part until it is supported against the bearing surface 15a1 of the sealing ring. The nut surrounding the rod is then screwed onto the connection element 111 so as to be supported against the O ring 132 which is arranged in the groove 131b in the end piece. The two resilient elements 15b and 132 are compressed by the nut 24 to an extent which is sufficient to ensure the sealing of the fluid circuit, but without blocking any rotational movement of the rod in relation to the part. In any event, the rotational movement is limited by the clearance provided around the rod by the nut, as indicated above, and the pressure exerted by the nut.

In order to function in an optimal manner and prevent premature degradation, a seal can be compressed in a given range, depending on the type of seal used. During the design of the device, the position of the axial stop of the nut is thus calculated in such a way that the two seals are compressed in the operating range thereof.

The solution from the disclosure thus allows, according to the maximum rate of compression of the seal 15, an adjustment of the angular position of the rod in relation to the part to which it is connected, without losing any impermeability of the connected fluid circuit.

Figure 1:
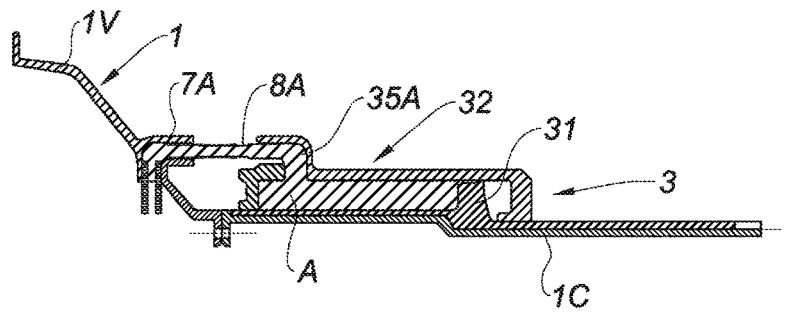
FIG. 1 is an axial section of a linear actuator which is mounted on a cylindrical case element.
Figure 1:
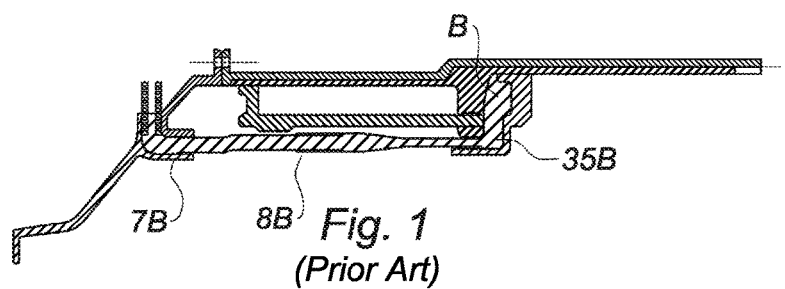
Figure 2:
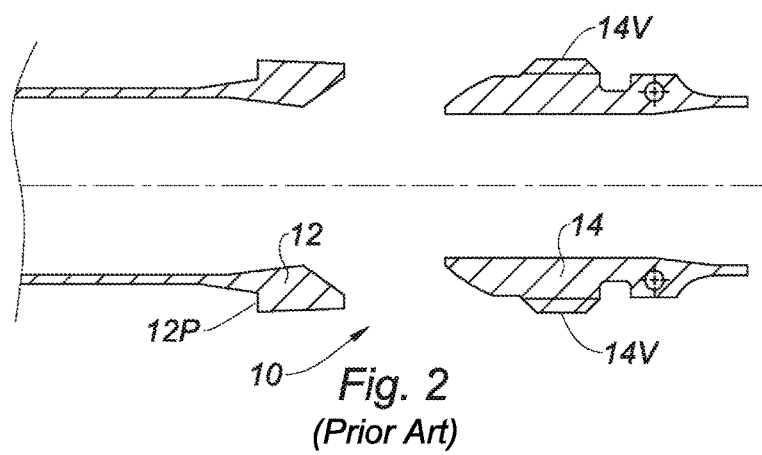
FIG. 2 shows a connection means of a tubular rod, according to the prior art having a nipple and a nozzle.
Figure 5:
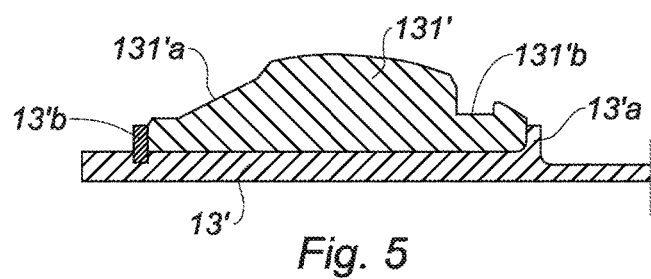
FIG. 5 shows a variant of a tubular rod having an attached end piece.

FIG. 5 shows a variant of the end piece. The end piece 131' is produced separately and machined and is connected to the rod 13 at the end thereof. The rod comprises an axial stop 13a', against which the end piece which has been slid onto the rod 13' is supported. The end piece is immobilized axially by a resilient ring 13'b or any other suitable means. The end piece 131', as in the preceding embodiment, comprises a bearing surface 131'a which is shaped so as to receive the contact surface of the O-ring seal 15 with the bottom of the opening and an annular groove 131'b for the seal 132 with the nut.

Figure 6:
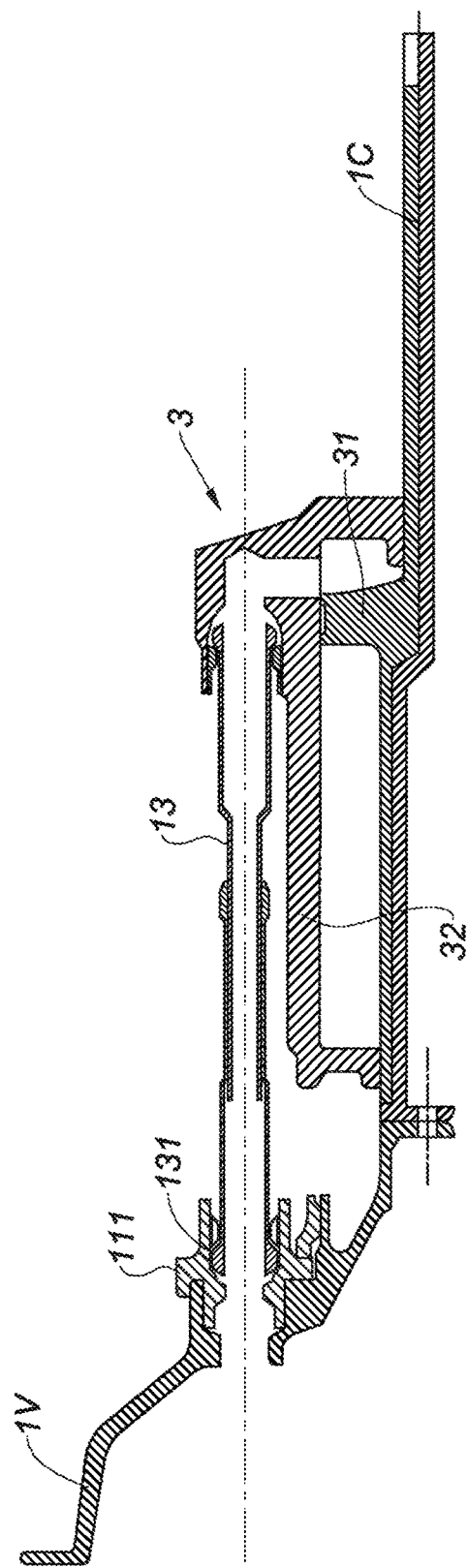
FIG. 6 is an axial section of a linear actuator having telescopic rods.

FIG. 6 shows an example of the disclosure with a linear actuator 3 mounted on the axial extension 1C of the casing collar 1V. The actuator is supplied with hydraulic engine fluid from the collar which comprises fluid distribution means 111. In the drawing, a single supply circuit has been shown. A system of telescopic rods 13 is mounted between a fluid distribution opening 111a in the collar and one of the engine chambers of the actuator.

As can be seen, the telescopic rods 13 are connected, one to the fluid distribution means 111 of the collar, the other to one of the chambers by connections from the disclosure which allow a certain degree of angular displacement.

When, as a result of mechanical stresses, the extension 1C of the collar undergoes an angular deformation in relation to the collar 1V, the angular displacement thereof is followed by the system of telescopic rods. During the displacement of the movable element 3 of the actuator, the rods follow the element without being subjected to a transverse force and are not distorted. The angular displacement does not affect the sealing of the supply circuit, due to the seals provided in the hydraulic connection.

Thus in the case of a turbine engine which is mounted on an aircraft, the mechanical stresses on the casing will not cause locking of the linear actuators as shown.

In summary, the disclosure makes it possible to compensate for misalignment and to prevent locking and failure of the system of telescopic injection rods, to transfer high-pressure (or non-high-pressure) oil from the fixed reference frame to the reference frame which is movable in translation and to be impervious under a predetermined maximum pressure.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A hydraulic connection device comprising a part having a hydraulic fluid passage opening and a tubular rod having an end piece, the end piece of the rod being hydraulically connected to the opening in the fluid passage, wherein the opening and the end piece of the rod each comprise a surface portion which is shaped so as to allow an angular displacement between the part and the rod, a seal being interposed between said two surface portions, the seal comprising a contact ring having a frustoconical contact surface and a resilient element, a nut for holding the tubular rod in the opening ensuring the compression of the resilient element, wherein one of said two surface portions comprises an annular groove, and said seal is received in the groove, the seal comprising a contact ring made of rigid material, which bears against the other of said two surface portions, the resilient element being interposed between a bottom of the groove and the contact ring.

2. The device according to claim 1, wherein a groove is made in the surface portion of the opening.

3. A turbine engine comprising at least one hydraulic connection device according to claim 1.

4. A hydraulic connection device comprising a part having a hydraulic fluid passage opening and a tubular rod having an end piece, the end piece of the rod being hydraulically connected to the opening in the fluid passage, wherein the opening and the end piece of the rod each comprise a surface portion which is shaped so as to allow an angular displacement between the part and the rod, a seal being interposed between said two surface portions, the seal comprising a contact ring having a frustoconical contact surface and a first resilient element, a nut for holding the tubular rod in the opening ensuring the compression of the first resilient element, and a second resilient element being arranged between the nut and the end piece of the tubular rod.

5. The device according to claim 4, wherein the second resilient element is an O ring forming a seal.

6. A fluid transfer system, disposed between a fixed casing and a movable member which is movable in translation with respect to the fixed casing, the system comprising a tubular rod hydraulically connected to either the fixed casing or the movable member via a part having a hydraulic fluid passage opening, an end piece of the tubular rod being hydraulically connected to the opening in the fluid passage, wherein the opening and the end piece of the tubular rod each comprise a surface portion which is shaped so as to allow an angular displacement between the part and the tubular rod, a seal being interposed between said two surface portions, the seal comprising a contact ring having a frustoconical contact surface and a resilient element, a nut for holding the tubular rod in the opening ensuring the compression of the resilient element, wherein the system is configured for fluid connection firstly between the casing and the tubular rod, and secondly between the tubular rod and the movable member.

7. The fluid transfer system according to claim 6, wherein the tubular rod is telescopic.

8. The fluid transfer system according to claim 6, wherein the movable member is a linear actuator which is controlled by hydraulic fluid.

9. A turbine engine comprising the fluid transfer system according to claim 6.

* * * * *